(12) United States Patent
Jiang

(10) Patent No.: US 10,970,756 B2
(45) Date of Patent: Apr. 6, 2021

(54) NON-STOP CHARGING METHODS, APPARATUSES, AND ELECTRONIC DEVICES

(71) Applicant: Advanced New Technologies Co., Ltd., Grand Cayman (KY)

(72) Inventor: Guofei Jiang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/889,649

(22) Filed: Jun. 1, 2020

(65) Prior Publication Data

US 2020/0311784 A1 Oct. 1, 2020

Related U.S. Application Data

(63) Continuation of application No. PCT/CN2019/075775, filed on Feb. 22, 2019.

(30) Foreign Application Priority Data

May 31, 2018 (CN) .......................... 201810554496.5

(51) Int. Cl.
*G08G 1/00* (2006.01)
*G06Q 30/02* (2012.01)
(Continued)

(52) U.S. Cl.
CPC ..... *G06Q 30/0284* (2013.01); *G06K 7/10366* (2013.01); *G06Q 20/085* (2013.01);
(Continued)

(58) Field of Classification Search
CPC ........ G08G 1/00; G08G 1/09; G06Q 30/0284; G06Q 20/085; G06Q 2240/00; G07B 15/063
See application file for complete search history.

(56) References Cited

U.S. PATENT DOCUMENTS

| 5,757,286 | A | 5/1998 | Jonsson et al. |
| 7,106,212 | B2 * | 9/2006 | Konishi ............... G07B 15/063 |
| | | | 340/905 |

(Continued)

FOREIGN PATENT DOCUMENTS

| CN | 101241609 | 8/2008 |
| CN | 101811481 | 8/2010 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Toan N Pham
(74) *Attorney, Agent, or Firm* — Fish & Richardson P.C.

(57) ABSTRACT

Disclosed herein are methods, systems, and apparatus, including computer programs encoded on computer storage media, for charging toll fees. One of the computer-implemented methods includes obtaining information of a vehicle traveling on a road, where the vehicle is associated with a user account on a payment platform. In response to determining that a distance the vehicle is driven on the road reaches a predetermined distance, initiating a toll fee charging request for the vehicle to the payment platform to charge a toll fee corresponding to the predetermined distance.

18 Claims, 8 Drawing Sheets

(51) Int. Cl.
*G06Q 20/30* (2012.01)
*G06K 7/10* (2006.01)
*G06Q 20/08* (2012.01)
*G06Q 20/10* (2012.01)
*G06Q 40/02* (2012.01)
*G07B 15/04* (2006.01)
*G07B 15/06* (2011.01)

(52) U.S. Cl.
CPC ......... *G06Q 20/108* (2013.01); *G06Q 20/308* (2020.05); *G06Q 40/02* (2013.01); *G07B 15/04* (2013.01); *G07B 15/063* (2013.01); *G06Q 2240/00* (2013.01)

(56) References Cited

U.S. PATENT DOCUMENTS

| | | | | |
|---|---|---|---|---|
| 10,311,650 | B2* | 6/2019 | Nelson | G06F 16/903 |
| 2002/0198767 | A1* | 12/2002 | Kim | G07B 15/063 705/13 |
| 2004/0230480 | A1* | 11/2004 | Kanayama | G07F 17/0014 705/13 |
| 2005/0086100 | A1* | 4/2005 | Yanagisawa | G07B 15/063 705/13 |
| 2005/0168351 | A1* | 8/2005 | Saze | G07B 15/063 340/928 |
| 2006/0106671 | A1 | 5/2006 | Biet | |
| 2009/0121898 | A1 | 5/2009 | Jia et al. | |
| 2013/0144687 | A1 | 6/2013 | Smely | |
| 2016/0232500 | A1 | 8/2016 | Wang et al. | |
| 2018/0101914 | A1 | 4/2018 | Samuel et al. | |

FOREIGN PATENT DOCUMENTS

| | | |
|---|---|---|
| CN | 102044154 | 5/2011 |
| CN | 201936386 | 8/2011 |
| CN | 102855671 | 1/2013 |
| CN | 102915569 | 2/2013 |
| CN | 102938087 | 2/2013 |
| CN | 203133903 | 8/2013 |
| CN | 103700149 | 4/2014 |
| CN | 103778677 | 5/2014 |
| CN | 104021594 | 9/2014 |
| CN | 104112296 | 10/2014 |
| CN | 104157017 | 11/2014 |
| CN | 104282045 | 1/2015 |
| CN | 105069850 | 11/2015 |
| CN | 105469453 | 4/2016 |
| CN | 105488722 | 4/2016 |
| CN | 105590346 | 5/2016 |
| CN | 105741367 | 7/2016 |
| CN | 106504355 | 3/2017 |
| CN | 106228840 | 7/2017 |
| CN | 106952352 | 7/2017 |
| CN | 106960594 | 7/2017 |
| CN | 107122937 | 9/2017 |
| CN | 107194778 | 9/2017 |
| CN | 107316347 | 11/2017 |
| CN | 107330681 | 11/2017 |
| CN | 107464118 | 12/2017 |
| CN | 107492262 | 12/2017 |
| CN | 107993298 | 5/2018 |
| CN | 108038925 | 5/2018 |
| CN | 108064017 | 5/2018 |
| CN | 108091167 | 5/2018 |
| CN | 108805995 | 11/2018 |
| CN | 108876937 | 11/2018 |
| CN | 108876946 | 11/2018 |
| CN | 108876947 | 11/2018 |
| DE | 29617339 | 1/1997 |
| JP | 2001022980 | 1/2001 |
| JP | 3824867 | 9/2006 |
| JP | 3824876 | 9/2006 |
| JP | 2008097616 | 4/2008 |
| JP | 2009199442 | 9/2009 |
| JP | 5380139 | 1/2014 |
| JP | 2015184999 | 10/2015 |
| KR | 20170001870 | 1/2017 |
| KR | 20170104868 | 9/2017 |
| TW | 543010 | 7/2003 |
| TW | 582603 | 4/2004 |

OTHER PUBLICATIONS

Hoi, "Blockchain-Genesis Block, Block, Merkle Tree, Hash," Jan. 16, 2018, retrieved on Jun. 17, 2020, retrieved at URL <https://www.samsonhoi.com/274/blockchain_genesis_block_merkle_tree>, 21 pages (with English translation).

Nakamoto, "Bitcoin: A Peer-to-Peer Electronic Cash System," www.bitcoin.org, 2005, 9 pages.

PCT International Search Report and Written Opinion in International Appln No. PCT/CN2019/075775, dated May 9, 2019, 9 pages (with partial English translation).

PCT International Search Report and Written Opinion in International Appln. No. PCT/CN2019/075747, dated Dec. 5, 2019, 16 pages (with English translation).

PCT International Search Report and Written Opinion in International Appln. No. PCT/CN2019/075776, dated Dec. 5, 2019, 16 pages (with English translation).

PCT International Search Report and Written Opinion in International Appln. No. PCT/CN2019/075777, dated May 5, 2019, 17 pages (with English translation).

Wu et al., "The Introduction of ETC System and Implementation Achievement," Civil Engineering and Water Resources, Apr. 2018, 45(2):32-38 (with English Abstract).

European Extended Search Report in European Application No. 19812286.3, dated Jan. 28, 2021, 13 pages.

* cited by examiner

NON-STOP CHARGING METHODS, APPARATUSES, AND ELECTRONIC DEVICES

CROSS-REFERENCE TO RELATED APPLICATIONS

This application is a continuation of PCT Application No. PCT/CN2019/075775, filed on Feb. 22, 2019, which claims priority to Chinese Patent Application No. 201810554496.5, filed on May 31, 2018, and each application is hereby incorporated by reference in its entirety.

TECHNICAL FIELD

One or more implementations of the present specification relate to the field of road management technologies, and in particular, to non-stop charging methods, apparatuses, and electronic devices.

BACKGROUND

Vehicle tolls of road users are charged for reclaiming costs of road construction and maintenance, so as to implement sustainable road maintenance. Specifically, a user can pay a corresponding amount of assets to a road owner based on a driving distance of a vehicle on a road. Therefore, the driving distance of the vehicle needs to be calculated in a certain method, so that the user is charged a corresponding toll.

SUMMARY

In view of this, one or more implementations of the present specification provide non-stop charging methods, apparatuses, and electronic devices.

To achieve the previous objective, one or more implementations of the present specification provide the following technical solutions:

A first aspect of the one or more implementations of the present specification provides a non-stop charging method, applied to a road charging system, where the method includes the following: obtaining vehicle information of a driving vehicle on a road, where the vehicle information has a corresponding user account on a payment platform; and initiating an asset charging request for the vehicle information to the payment platform each time a driving distance of the driving vehicle on the road reaches a predetermined distance, so as to charge an asset corresponding to the predetermined distance.

A second aspect of the one or more implementations of the present specification provides a non-stop charging method, applied to a road charging system, where the method includes the following: obtaining vehicle information of a driving vehicle on a road, where the vehicle information has a corresponding user account on a payment platform; and initiating an asset charging request for the vehicle information to the payment platform based on a driving distance of the driving vehicle on the road each time the driving vehicle approaches any exit of the road, so as to charge an asset corresponding to the driving distance.

A third aspect of the one or more implementations of the present specification provides a non-stop charging apparatus, applied to a road charging system, where the apparatus includes the following: an acquisition unit, configured to obtain vehicle information of a driving vehicle on a road, where the vehicle information has a corresponding user account on a payment platform; and a requesting unit, configured to initiate an asset charging request for the vehicle information to the payment platform each time a driving distance of the driving vehicle on the road reaches a predetermined distance, so as to charge an asset corresponding to the predetermined distance.

A fourth aspect of the one or more implementations of the present specification provides a non-stop charging apparatus, applied to a road charging system, where the apparatus includes the following: an acquisition unit, configured to obtain vehicle information of a driving vehicle on a road, where the vehicle information has a corresponding user account on a payment platform; and a requesting unit, configured to initiate an asset charging request for the vehicle information to the payment platform based on a driving distance of the driving vehicle on the road each time the driving vehicle approaches any exit of the road, so as to charge an asset corresponding to the driving distance.

A fifth aspect of the one or more implementations of the present specification provides an electronic device, including the following: a processor; and a memory, configured to store a processor-executable instruction, where the processor is configured to perform the method described in any one of the previous implementations.

DESCRIPTION OF IMPLEMENTATIONS

Example implementations are described in detail here, and examples of the example implementations are presented in the accompanying drawings. When the following description relates to the accompanying drawings, unless specified otherwise, the same numbers in different accompanying drawings represent same or similar elements. Implementations described below do not represent all implementations consistent with one or more implementations of the present specification. On the contrary, the implementations are only examples of apparatuses and methods that are described in the appended claims in detail and consistent with some aspects of one or more implementations of the present specification.

It is worthwhile to note that in other implementations, steps of a corresponding method are not necessarily performed according to the sequence shown and described in the present specification. In some other implementations, the method can include more or less steps than those described in the present specification. In addition, a single step described in the present specification may be divided into a plurality of steps in other implementations for description. However, a plurality of steps described in the present specification may also be combined into a single step for description in other implementations.

Figure 1:
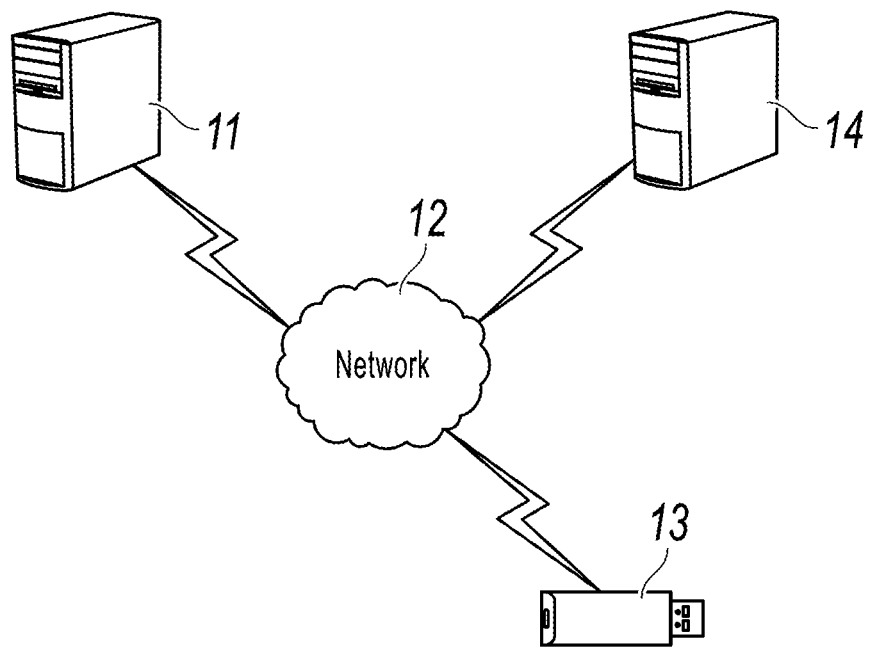
FIG. 1 is a schematic architectural diagram illustrating a non-stop charging system, according to an example implementation.

FIG. 1 is a schematic architectural diagram illustrating a non-stop charging system, according to an example implementation. As shown in FIG. 1, the system can include a road charging server 11, a network 12, an Internet of Things device 13, and a payment platform server 14.

The road charging server 11 can be a physical server including an independent host, or the road charging server 11 can be a virtual server including a host cluster. In a running process, the road charging server 11 can run and be implemented as a road charging system. When a user drives on a road section managed by the road charging system, the road charging system is configured to charge the user.

The Internet of Things device 13 can be implemented as at least one of the following types of electronic devices: a monitoring device, a radio frequency identification (RFID) reader, a Bluetooth device, an optical sensor, a signal receiver, etc. Implementations are not limited in one or more implementations of the present specification. The Internet of Things device 13 is configured to collect information about a driving vehicle on the road section, and provide the collected vehicle information to the road charging server 11.

The payment platform server 14 can be a physical server including an independent host, or the payment platform server 14 can be a virtual server including a host cluster. In a running process, the payment platform server 14 can run and be implemented as a payment platform. When a user and the road charging system each have a registered account on the payment platform, the road charging system can initiate a request to the payment platform, so that the payment platform automatically transfers an asset from an account corresponding to the user to an account corresponding to the road charging system.

The network 12 for interaction between the road charging server 11, the Internet of Things device 13, and the payment platform server 14 can include multiple types of wired or wireless networks. In an implementation, the network 12 can include a public switched telephone network (PSTN) and the Internet. Implementations are not limited in the present specification, certainly.

Figure 2:
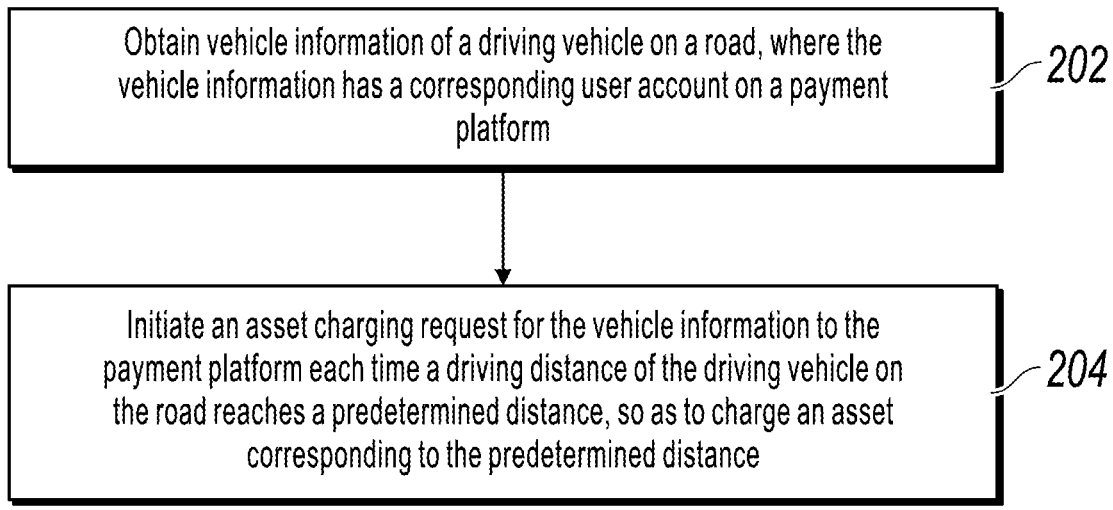
FIG. 2 is a flowchart illustrating a non-stop charging method, according to an example implementation.

FIG. 2 is a flowchart illustrating a non-stop charging method, according to an example implementation. As shown in FIG. 2, the method is applied to a road charging system (e.g., included in the road charging server 11 shown in FIG. 1), and can include the following steps.

Step 202: Obtain vehicle information of a driving vehicle on a road, where the vehicle information has a corresponding user account on a payment platform.

In an implementation, an information acquisition operation can be performed on the driving vehicle on the road by using a first Internet of Things device associated with the road charging system, and the vehicle information of the driving vehicle can be determined based on information obtained by the first Internet of Things device. The first Internet of Things device includes at least one of the following: a monitoring device, an RFID reader, a Bluetooth device, an optical sensor, a signal receiver, etc. Implementations are not limited in the present specification.

For example, when the first Internet of Things device includes a monitoring device, the monitoring device can photograph an image of the driving vehicle on the road, and analyze content of the photographed image to determine the vehicle information of the driving vehicle.

For example, when the first Internet of Things device includes an RFID reader, the RFID reader can read an RFID signal transmitted by an RFID tag installed on the driving vehicle, where the RFID signal can include the vehicle information of the driving vehicle.

For example, when the first Internet of Things device includes a first Bluetooth device, the Bluetooth device can read a Bluetooth signal sent by a second Bluetooth device installed on the driving vehicle, where the Bluetooth signal can include the vehicle information of the driving vehicle.

For example, when the first Internet of Things device includes an optical sensor, the surface of the driving vehicle can be coated with an optical medium of a predetermined material. The optical medium is used to generate appearance data of the driving vehicle, and the optical sensor can scan the driving vehicle, so as to obtain body surface structure data of the driving vehicle, and use the body surface structure data as the vehicle information of the driving vehicle. The optical medium can be a nano-optical film. After the nano-optical film is coated on an outer surface of the vehicle, a piece of nano-optical film can be formed, to automatically cure a vehicle appearance. Accordingly, the optical sensor can be configured to capture light of a specific wavelength generated or reflected by the optical film, so as to accurately generate the body surface structure data of the vehicle.

For example, when the first Internet of Things device includes a signal receiver, the surface of the driving vehicle can be coated with an electrical medium of a predetermined material. The electrical medium is used to generate appearance data of the driving vehicle, and the signal receiver can scan the driving vehicle, so as to obtain body surface structure data of the driving vehicle, and use the body surface structure data as the vehicle information of the driving vehicle. The electrical medium can be a carbon structural material of a nanometer level. After the carbon structural material is coated on an outer surface of the vehicle, a circuit layer that encloses the vehicle can be formed. The circuit layer can generate an electrical signal uniquely corresponding to the body surface structure data, and send the electrical signal to the signal receiver, so that the electrical signal is used as the vehicle information of the driving vehicle.

In an implementation, the road can be divided into several road sections, and each first Internet of Things device can correspond to one or more road sections, so as to collect information about a driving vehicle on the corresponding road section. For example, if an RFID reader is installed at each road section, only when a vehicle passes through a corresponding road section, the RFID reader can collect an RFID signal transmitted by an RFID tag installed on the vehicle. For another example, if a camera of a monitoring device faces multiple road sections, so that an image photographed by the camera covers the road sections, information about vehicles driving on the road sections can be collected based on the photographed image collected by the camera, so as to obtain corresponding vehicle information.

In an implementation, when it is determined that there is a driving vehicle on the road section by using the first Internet of Things device, an information acquisition operation can be further performed on the driving vehicle by using the first Internet of Things device. In other words, the first Internet of Things device can be used to determine that there is a driving vehicle on the road section, and can also obtain vehicle information of the driving vehicle. For example, when the first Internet of Things device includes a monitoring device, a photographed image collected by the monitoring device can be used to identify a use status of the road section (i.e., whether there is a vehicle driving on the road section), and can also be used to identify vehicle information of the driving vehicle on the road section (e.g., identify a license plate number of the driving vehicle).

In an implementation, when it is determined that there is a driving vehicle on the road section by using a second Internet of Things device associated with the road charging system, an information acquisition operation can be further performed on the driving vehicle by using the first Internet of Things device. In other words, the second Internet of Things device is used to determine that there is a driving vehicle on the road section, and the first Internet of Things device is used to obtain vehicle information of the driving vehicle. For example, the second Internet of Things device can include at least one of the following: an underground induction coil, a ranging device, an infrared detection device, etc. Implementations are not limited in the present specification.

For example, when the second Internet of Things device includes an underground induction coil, the underground induction coil can be installed under the ground of the road section or at another location, so that a vehicle passing through the road section can trigger the underground induction coil. Further, the second Internet of Things device can directly trigger the first Internet of Things device, or trigger the first Internet of Things device by using the road charging system, so that the first Internet of Things device obtains the vehicle information of the driving vehicle on the road section.

For example, when the second Internet of Things device includes a ranging device, the ranging device can be installed above the road section or at another location for ranging toward the ground of the road section, and the vehicle passing through the road section can trigger a change of a ranging result of the ranging device. Further, the second Internet of Things device can directly trigger the first Internet of Things device, or trigger the first Internet of Things device by using the road charging system, so that the first Internet of Things device obtains the vehicle information of the driving vehicle on the road section.

For example, when the second Internet of Things device includes an infrared detection device, the infrared detection device can be installed above or in front of the road section or at another location, so that the vehicle passing through the road section can trigger the infrared detection device to generate a predetermined infrared detection result. Further, the second Internet of Things device can directly trigger the first Internet of Things device, or trigger the first Internet of Things device by using the road charging system, so that the first Internet of Things device obtains the vehicle information of the driving vehicle on the road section.

In an implementation, the vehicle information can include any information used to represent a vehicle identity, and implementations are not limited in the present specification. For example, the vehicle information can include at least one of the following: a license plate number, a paint color, a vehicle model, body surface structure data, vehicle driver information, vehicle passenger information, etc. Implementations are not limited in the present specification.

Step 204: Initiate an asset charging request for the vehicle information to the payment platform each time a driving distance of the driving vehicle on the road reaches a predetermined distance, so as to charge an asset corresponding to the predetermined distance.

In an implementation, the driving distance of the driving vehicle on the road is counted cyclically, and the asset charging request is initiated to the payment platform each time the driving distance reaches the predetermined distance, so that a corresponding toll can be charged stage by stage when the driving vehicle drives on the road. Therefore, after a driver drives the driving vehicle away from the road, payment operations, including both a payment operation actively performed by the driver and a payment operation automatically triggered by the road charging system for the payment platform, on the toll are not triggered. Actually, a certain delay may be caused due to processes such as data processing and data transmission even in the payment operation automatically triggered by the road charging system. Therefore, according to the technical solution of the present specification, situations that the delay occurs in the process of driving the driving vehicle away can be reduced, and the process that the driving vehicle drives away from the road is not interrupted, so that persons (the driver and a passenger) in the vehicle are unaware of the payment process of the toll, thereby enhancing application experience.

In an implementation, after the driving vehicle on the road is detected, the driving distance of the driving vehicle on the road can start to be recorded. When the driving distance of the driving vehicle on the road reaches the predetermined distance, the road charging system can initiate the asset charging request for the vehicle information to the payment platform. After the asset corresponding to the predetermined distance is charged, the road charging system can reset the driving distance to recalculate the driving distance. Based on the previous method, the driving distance of the driving vehicle on the road can be counted cyclically, so that a corresponding toll is charged stage by stage in the driving process. Certainly, in addition to the resetting processing for the driving distance, the driving distance can be counted cyclically by using another method. Methods are not limited in the present specification.

In an implementation, a value of the predetermined distance can be set based on needs, for example, 1 km, 300 m, 100 m, or 1 m. The predetermined distance is set as small as possible, for example, 1 m, and even a similar effect and feeling of "real-time charging" can be generated, so that the toll of the driving vehicle can be calculated and charged more accurately.

In an implementation, the charged asset corresponding to the predetermined distance comes from the user account corresponding to the vehicle information on the payment platform. For example, the payment platform can directly transfer the corresponding asset from the user account to an account of the road charging system on the payment platform.

In an implementation, when a credit limit of the user account is not exceeded, the charged asset corresponding to the predetermined distance comes from a credit asset related to the user account. For example, the payment platform can transfer a corresponding asset from an account of the payment platform to an account of the road charging system on the payment platform, regardless of whether the user account has sufficient assets. Subsequently, an owner of the user account can transfer the asset advanced by the payment platform to the account of the payment platform at any time within a predetermined time period. Otherwise, the owner needs to transfer more assets to the account of the payment platform after the predetermined time period expires, and the amount of assets is positively correlated with a quantity of days after expiration, which is equivalent to transferring a fine or an interest to the payment platform.

In an implementation, any type of asset such as cash, a security, and a blockchain asset can be used in the present specification to pay the toll, and implementations are not limited in the present specification.

In an implementation, the toll can dynamically change. For example, a toll within 1 km is 0 yuan, and a toll over 1 km is 1 yuan/km. Therefore, a total driving distance of the driving vehicle on the road can be counted. Then, the asset charging request is initiated to the payment platform based on a charging criterion corresponding to a distance range within which the total driving distance falls.

In an implementation, in the present specification, because the road charging system can automatically charge a toll for a vehicle driving on the road, no blocking facility needs to be disposed at an exit of the road, so that the vehicle can smoothly drive away without stopping. However, it needs to be ensured that a toll can be automatically charged by the road charging system for each vehicle entering the road; otherwise, some tolls may be neglected. Therefore, when any vehicle drives to an entrance of the road, a query request can be initiated to the payment platform based on vehicle information of the any vehicle. When it is determined that a user account corresponding to the vehicle information of the any vehicle exists on the payment platform, it indicates that the road charging system can automatically charge a toll for the any vehicle based on the present specification, and therefore, can allow the any vehicle to pass, so that the any vehicle enters the road; otherwise, the road charging system refuses the any vehicle to pass.

Figure 3:
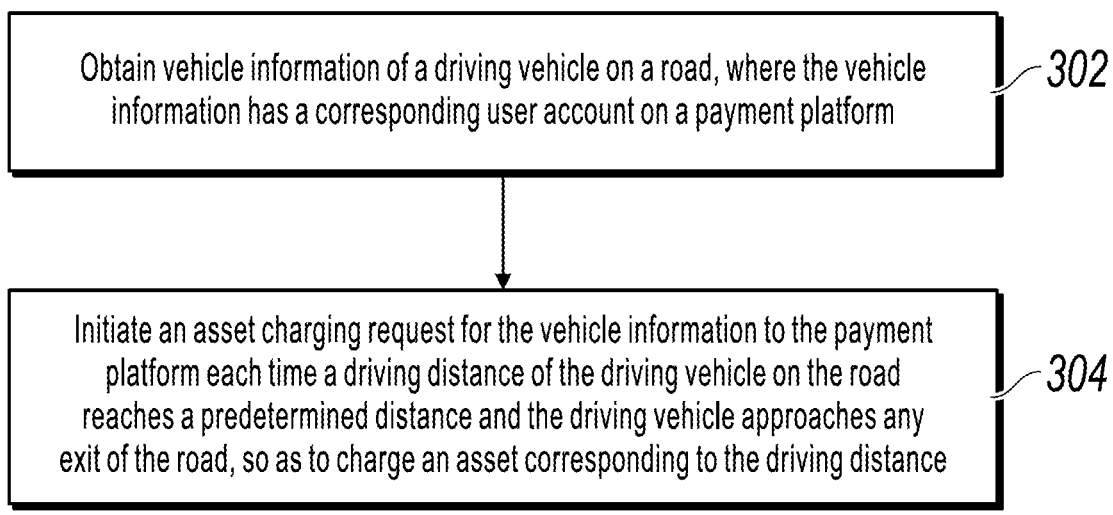
FIG. 3 is a flowchart illustrating another non-stop charging method, according to an example implementation.

FIG. 3 is a flowchart illustrating another non-stop charging method, according to an example implementation. As shown in FIG. 3, the method is applied to a road charging system (e.g., included in the road charging server 11 shown in FIG. 1), and can include the following steps.

Step 302: Obtain vehicle information of a driving vehicle on a road, where the vehicle information has a corresponding user account on a payment platform.

In an implementation, for step 302 and related descriptions, references can be made to step 202 and the related descriptions. Details are omitted here for simplicity.

Step 304: Initiate an asset charging request for the vehicle information to the payment platform based on a driving distance of the driving vehicle on the road each time the driving vehicle approaches any exit of the road, so as to charge an asset corresponding to the driving distance.

In an implementation, when the driving vehicle does not approach any exit of the road, the driving vehicle cannot drive away from the road, and therefore, it is unnecessary to frequently and repeatedly initiate the asset charging request to the payment platform and charge the asset, so that interactions are reduced. When the driving vehicle approaches any exit of the road, the driving vehicle may drive away from the road from the any exit. Therefore, when the driving vehicle approaches the any exit of the road, the asset charging request can be initiated to charge the corresponding asset. If the driving vehicle does not drive away from an exit, the driving distance can be continuously counted by using the technical solution of the present specification, so as to charge a toll at the exit subsequently. If the driving vehicle drives away from an exit, because a toll has been charged, the process that the driving vehicle drives away from the road is not interrupted, so that persons (a driver and a passenger) in the vehicle are unaware of the payment process of the toll, thereby enhancing application experience.

In an implementation, when it is detected that the driving vehicle is on the road, the driving distance of the driving vehicle can start to be recorded. When the driving vehicle approaches any exit of the road, the asset charging request for the vehicle information can be initiated to the payment platform. After the asset corresponding to the driving distance is charged, the road charging system can reset the driving distance to recalculate the driving distance. Based on the previous method, the driving distance of the driving vehicle on the road can be counted stage by stage, so that a corresponding toll is charged stage by stage in the driving process. Certainly, in addition to the resetting processing for the driving distance, the driving distance can be counted stage by stage by using another method. Methods are not limited in the present specification.

In an implementation, the driving distance of the driving vehicle on the road can be counted. When the driving distance does not reach a predetermined distance, charging does not have to be performed for the driving vehicle. In this case, the asset charging request does not have to be initiated even when the driving vehicle approaches any exit of the road. In other words, the asset charging request for the vehicle information can be initiated to the payment platform each time the driving distance of the driving vehicle on the road reaches the predetermined distance and the driving vehicle approaches any exit of the road, so as to charge the asset corresponding to the driving distance.

In an implementation, a value of the predetermined distance can be set based on needs, for example, 1 km, 300 m, 100 m, or 1 m. The predetermined distance is set as small as possible, for example, 1 m, and even a similar effect and feeling of "real-time charging" can be generated, so that the toll of the driving vehicle can be calculated and charged more accurately.

In an implementation, the charged asset corresponding to the driving distance comes from the user account corresponding to the vehicle information on the payment platform. For example, the payment platform can directly transfer the corresponding asset from the user account to an account of the road charging system on the payment platform.

In an implementation, when a credit limit of the user account is not exceeded, the charged asset corresponding to the driving distance comes from a credit asset related to the user account. For example, the payment platform can transfer a corresponding asset from an account of the payment platform to an account of the road charging system on the payment platform, regardless of whether the user account has sufficient assets. Subsequently, an owner of the user account can transfer the asset advanced by the payment platform to the account of the payment platform at any time within a predetermined time period. Otherwise, the owner needs to transfer more assets to the account of the payment platform after the predetermined time period expires, and the amount of assets is positively correlated with a quantity of days after expiration, which is equivalent to transferring a fine or an interest to the payment platform.

In an implementation, any type of asset such as cash, a security, and a blockchain asset can be used in the present specification to pay the toll, and implementations are not limited in the present specification.

In an implementation, the toll can dynamically change. For example, a toll within 1 km is 0 yuan, and a toll over 1 km is 1 yuan/km. Therefore, a total driving distance of the driving vehicle on the road can be counted. Then, the asset charging request is initiated to the payment platform based on a charging criterion corresponding to a distance range within which the total driving distance falls.

In an implementation, in the present specification, because the road charging system can automatically charge a toll for a vehicle driving on the road, no blocking facility needs to be disposed at an exit of the road, so that the vehicle can smoothly drive away without stopping. However, it needs to be ensured that a toll can be automatically charged by the road charging system for each vehicle entering the road; otherwise, some tolls may be neglected. Therefore, when any vehicle drives to an entrance of the road, a query request can be initiated to the payment platform based on vehicle information of the any vehicle. When it is determined that a user account corresponding to the vehicle information of the any vehicle exists on the payment platform, it indicates that the road charging system can automatically charge a toll for the any vehicle based on the present specification, and therefore, can allow the any vehicle to pass, so that the any vehicle enters the road; otherwise, the road charging system refuses the any vehicle to pass.

Figure 4:
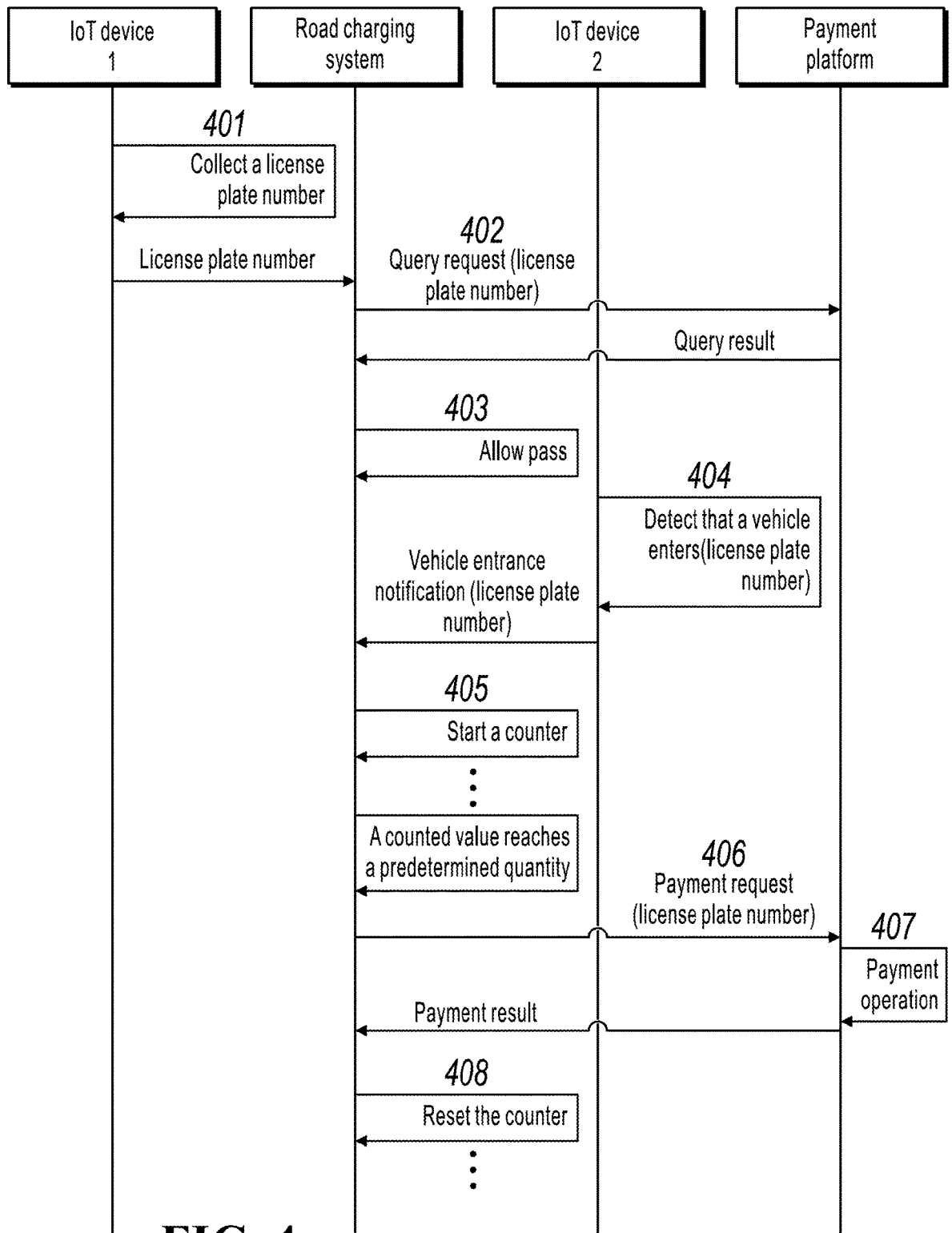
FIG. 4 is a schematic interaction diagram illustrating highway automatic charging, according to an example implementation 1.

For ease of understanding, technical solutions of one or more implementations of the present specification are described by using "highway automatic charging" as an example. FIG. 4 is a schematic interaction diagram illustrating highway automatic charging, according to an example implementation 1. As shown in FIG. 4, assume that a road charging system and an IoT device 1 and an IoT device 2 that are associated with the road charging system are configured on a highway. The road charging system can automatically charge a toll based on detection data of the IoT device 1 and the IoT device 2 in cooperation with a payment platform. The interaction process of the highway automatic charging can include the following steps.

Step 401: The IoT device 1 collects a license plate number, and sends the license plate number to the road charging system.

In an implementation, assume that the IoT device 1 is disposed at an entrance of the highway, and is configured to detect vehicle information of a vehicle that wants to enter the highway. For example, the vehicle information can include a license plate number.

In an implementation, the IoT device 1 can include any electronic device capable of collecting vehicle information of a vehicle. A license plate number is used as an example. For example, the IoT device 1 can be an image collection device, and an image collected by the image collection device for a vehicle can be used to identify the license plate number. For another example, the IoT device 1 can be an RFID reader, the RFID reader can read an RFID signal transmitted by an RFID tag installed on a vehicle, and the RFID signal can include a license plate number of the corresponding vehicle.

In an implementation, the IoT device 1 can use vehicle information of other types other than the license plate number, or combine the license plate number with vehicle information of other types, so as to reduce possible abnormal situations of vehicles, for example, "vehicle cloning", and prevent a loss to a cloned vehicle.

Step 402: The road charging system sends a query request to the payment platform, where the query request includes the license plate number of the vehicle, and receives a query result returned by the payment platform.

Step 403: When the query result is that a user account corresponding to the license plate number exists on the payment platform, allow the corresponding vehicle to pass, so that the vehicle enters the highway.

In an implementation, a driver of the vehicle or another associated user needs to preset a corresponding user account on the payment platform, and binds the user account to the license plate number of the vehicle, etc. Based on a binding relationship between the user account and the license plate number, the payment platform can detect the license plate number provided by the road charging system to determine whether the corresponding user account exists. For example, when the license plate number is "A12345", assuming that the payment platform can identify that the bound user account is account 1, the payment platform can return a query result of "an account is bound"; or assuming that the payment platform does not identify a bound user account, the payment platform can return a query result of "no account is bound".

In an implementation, in the present specification, a toll of a vehicle is automatically charged by the road charging system. Therefore, no blocking apparatus such as a parking barrier needs to be disposed at an exit of the highway, so that the vehicle can drive away from the highway directly and smoothly without staying at the exit for payment, etc. Therefore, through steps 401 to 403, before a vehicle enters the highway, it can be determined that the vehicle has a corresponding user account on the payment platform, so as to ensure that the vehicle can support the technical solution of the present specification and that the parking charging system can automatically charge a toll based on the user account. A vehicle that cannot support the technical solution of the present specification should be prohibited from passing because a toll cannot be charged for the related vehicle by the road charging system and the vehicle cannot stay at the exit for payment. Therefore, the toll cannot be successfully charged.

Step 404: After detecting that the vehicle enters a road section monitored by the IoT device 2, the IoT device 2 sends a corresponding vehicle entrance notification to the road charging system, where the vehicle entrance notification includes the license plate number of the related vehicle obtained by the IoT device 2.

In an implementation, the IoT device 2 can include any electronic device capable of detecting that a vehicle enters a corresponding road section and obtaining a license plate number of the vehicle. Implementations are not limited in the present specification.

In an implementation, the IoT device 2 can be a monitoring device. The monitoring device can monitor one or more road sections of the highway. The monitoring device can analyze whether a vehicle enters a corresponding road section by using a monitoring image, and analyze a license plate number of the vehicle from the monitoring image.

In an implementation, the IoT device 2 can be an RFID reader. One RFID reader can be disposed for each road section of the highway, and a valid reading range of the RFID reader does not go beyond the corresponding road section. Therefore, when a vehicle enters a road section, only an RFID reader disposed at the road section can activate an RFID tag on the vehicle. In this case, it can be detected that the vehicle enters the road section. In addition, the RFID reader can read an RFID signal transmitted by the RFID tag, and the RFID signal can include a license plate number of the vehicle on which the RFID tag is located.

The "activating an RFID tag" refers to a situation that the RFID tag is of a passive type. In other situations, the RFID tag on the vehicle can be of an active type, so that the RFID tag can actively transmit the RFID signal without being "activated". Transmit power of the RFID tag is limited and a transmit range of the RFID signal is controlled, so that the RFID reader can also determine that the vehicle enters the corresponding road section based on the received RFID signal and determine the license plate number of the driving vehicle.

Step 405: The road charging system starts a counter to record a driving distance of the related vehicle based on the vehicle entrance notification sent by the IoT device 2.

In an implementation, assuming that a license plate number included in the vehicle entrance notification is "A12345", the road charging system can start corresponding counter 1 for "A12345", and counter 1 is dedicated to recording a driving distance of the vehicle "A12345".

In an implementation, IoT devices 2 can be disposed on the highway at equal spacings, and a spacing between adjacent IoT devices 2 is known data. Therefore, by counting vehicle entrance notifications sent by the IoT devices 2 to the road charging system, a driving distance of a corresponding vehicle can be calculated based on the spacing and a counted value. For example, when the spacing between adjacent IoT devices 2 is 500 m, if the road charging system receives 10 vehicle entrance notifications, the driving distance of the corresponding vehicle is 5 km.

Certainly, in some situations, adjacent IoT devices 2 can be disposed at unequal spacings. In this case, a vehicle entrance notification can include information such as a device identifier of an IoT device 2 serving as a sending party, so that the road charging system can determine the IoT device 2 corresponding to the vehicle entrance notification, and the road charging system can determine a driving distance of a vehicle based on pre-recorded spacings between IoT devices 2.

Step 406: After the counter counts to a predetermined quantity, the road charging system initiates a payment request to the payment platform, where the payment request includes the license plate number of the related vehicle.

In an implementation, when the previously described counter-based technical solution is used, a corresponding predetermined distance can be indirectly set by setting the predetermined quantity, so that when the counter reaches the predetermined quantity, the driving distance of the vehicle reaches the predetermined distance, and therefore, a driving process of the vehicle on the highway is divided into several stages with a length of the predetermined distance, and a corresponding toll is paid in each stage through steps 406 and 407, etc. Certainly, even if the driving distance of the vehicle is determined in another way, the predetermined distance can be set directly or indirectly, and the driving process of the vehicle on the highway can be divided into several stages with a length of the predetermined distance, so that a corresponding toll is paid in each stage through steps 406 and 407, etc.

Step 407: The payment platform helps complete a payment operation of a toll based on the payment request initiated by the road charging system.

In an implementation, assuming that a spacing between adjacent IoT devices 2 is 500 m and the predetermined quantity corresponding to counter 1 is 2, when the road charging system receives two vehicle entrance notifications corresponding to the license plate number "A12345", the road charging system can automatically initiate the payment request to the payment platform, where the payment request includes the license plate number "A12345" corresponding to counter 1. In addition, the payment platform identities that the bound user account is account 1 based on the license plate number "A12345", so as to perform an automatic payment operation for account 1.

In an implementation, the road charging system can include a payment amount in the payment request; or the road charging system and the payment platform can pre-agree on a payment amount calculation rule, so that the payment platform can determine a payment amount based on the calculation rule. For example, when the pre-agreed calculation rule is 1 yuan/km, the road charging system can include "payment amount=1 yuan" in the payment request; or the road charging system can include "driving distance=1 km" in the payment request, so that the payment platform determines that a corresponding payment amount is 1 yuan based on the pre-agreed calculation rule "1 yuan/km".

In an implementation, the road charging system has corresponding account 2 on the payment platform, and the payment platform can transfer a fund corresponding to the payment amount from account 1 corresponding to the license plate number "A12345" to account 2, so as to complete automatic charging of the toll. In another implementation, if account 1 has a credit limit on the payment platform, and the remaining credit limit is not less than the payment amount, the payment platform can transfer the fund corresponding to the payment amount from an account of the payment platform (or another account such as a credit line dedicated account) to account 2, and deduct the payment amount from the credit limit corresponding to account 1. In this case, even if remaining funds of account 1 are insufficient to pay the payment amount, the road charging system can still charge the corresponding toll.

Step 408: When a received payment result is that the payment succeeds, the road charging system controls the corresponding counter to reset.

In an implementation, assuming that the payment result indicates that the toll is successfully charged for the vehicle whose license plate number is "A12345", and the road charging system can reset counter 1 (i.e., reset counter 1 to 0) corresponding to "A12345", so that the road charging system recounts the driving distance of the vehicle "A12345".

Therefore, in the process that the vehicle drives on the highway, steps 404 to 408 can be repeatedly triggered, so that the road charging system cooperates with the payment platform, to charge the toll automatically, continually, and stage by stage until the vehicle drives away from the highway.

In an implementation, in the process that the vehicle "A12345" drives on the highway, the road charging system has charged the corresponding toll in cooperation with the payment platform, and it has been verified in steps 401 to 403 that the vehicle "A12345" can support the technical solution of the present specification. Therefore, when the vehicle "A12345" drives away from the highway, it is assumed by default that the toll is actually paid by the vehicle "A12345". Therefore, the vehicle "A12345" can directly drive away from an exit of the highway, and there is no need to dispose any facility that may impede or hinder the driving, for example, a railing, at the exit. Therefore, it is ensured that the vehicle "A12345" can drive away from the exit of the highway smoothly and without interruption, thereby enhancing user experience and maintaining driving safety and driving order on the highway.

Figure 5:
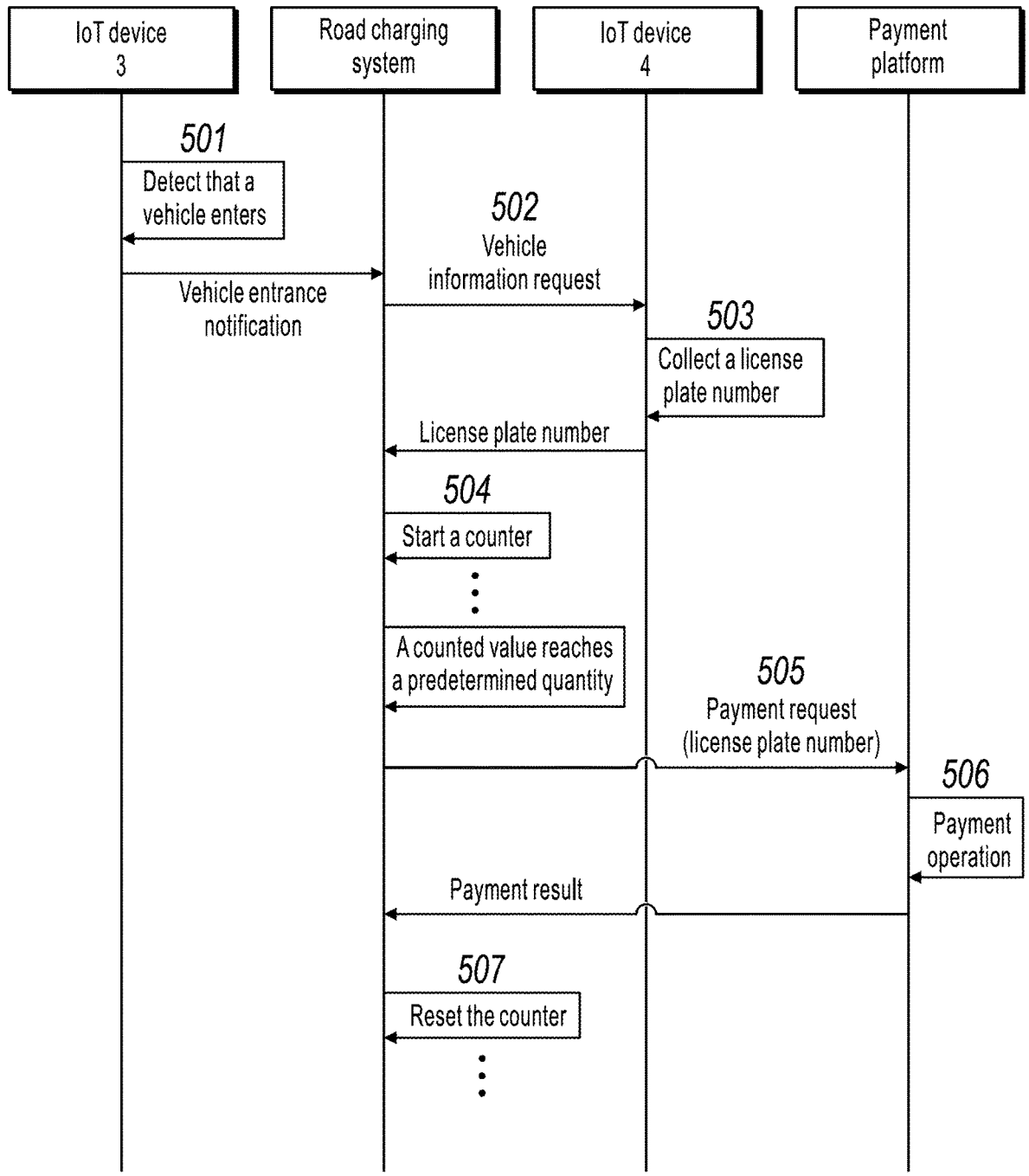
FIG. 5 is a schematic interaction diagram illustrating another type of highway automatic charging, according to an example implementation 1.

In the implementation shown in FIG. 4, the IoT device 1 is used to help determine whether a vehicle that wants to enter a highway can support the technical solution of the present specification, so that a toll is automatically paid, and the IoT device 2 is used to identify whether the vehicle enters a related road section and obtain vehicle information of the vehicle, so that the road charging system can further automatically charge the toll based on a vehicle entrance notification sent by the IoT device 2. In some situations, "identifying whether a vehicle enters a related road section" and "obtaining vehicle information of the vehicle" can be completed by different IoT devices. The following describes a corresponding implementation with reference to FIG. 5. FIG. 5 is a schematic interaction diagram illustrating another type of highway automatic charging, according to an example implementation 1. As shown in FIG. 5, assume that a road charging system and an IoT device 3 and an IoT device 4 that are associated with the road charging system are configured on a highway. The road charging system can automatically charge a toll based on detection data of the IoT device 3 and the IoT device 4 in cooperation with a payment platform. The interaction process of the highway automatic charging can include the following steps.

Step 501: When detecting that a vehicle enters a road section, the IoT device 3 sends a vehicle entrance notification to the road charging system.

In an implementation, the IoT device 3 can include any IoT device capable of sensing a vehicle entering a road section. Implementations are not limited in the present specification.

In an implementation, the IoT device 3 can include an underground induction coil, and the underground induction coil can be installed under the ground of the corresponding road section or at another location, so that the vehicle entering the road section can trigger the underground induction coil.

In an implementation, the IoT device 3 can include a ranging device, the ranging device can be installed above the corresponding road section or at another location for ranging toward the ground, and the vehicle entering the road section can trigger a change of a ranging result of the ranging device.

In an implementation, the IoT device 3 can include an infrared detection device, the infrared detection device can be installed above or in front of the corresponding road section or at another location, and the vehicle entering the road section can trigger the infrared detection device to generate a predetermined infrared detection result.

In an implementation, the IoT device 3 can include a monitoring device. The monitoring device can monitor one or more road sections of the highway. The monitoring device can analyze whether a vehicle enters a road section by using a monitoring image.

Step 502: The road charging system initiates a vehicle information request to the IoT device 4.

In an implementation, monitoring ranges of the IoT device 3 and the IoT device 4 can be basically consistent. When the IoT device 3 detects that a vehicle enters a monitored road section, the road charging system can initiate a vehicle information request to the IoT device 4, and then the IoT device 4 detects the same road section to identify a license plate number of the vehicle entering the road section.

Step 503: The IoT device 4 collects a license plate number, and notifies the road charging system of the license plate number.

In an implementation, the IoT device 4 can include any electronic device capable of obtaining a license plate number of a vehicle entering a road section. Implementations are not limited in the present specification.

In an implementation, the IoT device 4 can be a monitoring device. The monitoring device can monitor at least some road sections monitored by the IoT device 3. The monitoring device can identify a license plate number of a vehicle through analysis on a monitoring image.

In an implementation, the IoT device 4 can be an RFID reader. A signal transceiving range of the RFID reader can cover at least some road sections monitored by the IoT device 3, so that when the IoT device 3 detects a vehicle entering a road section, the RFID reader can receive an RFID signal sent by an RFID tag installed on the vehicle, and read a license plate number of the vehicle included in the RFID signal.

Step 504: The road charging system starts a counter to record a driving distance of the related vehicle based on the license plate number sent by the IoT device 4.

In an implementation, similar to step 405 shown in FIG. 4, when adjacent IoT devices 3 (or adjacent IoT devices 4) are disposed on the highway at equal spacings, and a spacing between adjacent IoT devices 3 (or IoT devices 4) is known data, vehicle entrance notifications corresponding to the same license plate number are counted, so that a driving distance of a corresponding vehicle can be calculated based on the spacing and a counted value. For example, when the spacing between adjacent IoT devices 3 is 500 m, if the road charging system receives 10 vehicle entrance notifications, the driving distance of the corresponding vehicle is 5 km.

When adjacent IoT devices 3 are disposed at unequal spacings, a vehicle entrance notification can include information such as a device identifier of an IoT device 3 serving as a sending party, so that the road charging system can determine the IoT device 3 corresponding to the vehicle entrance notification, and further determine a driving distance of a vehicle based on pre-recorded spacings between IoT devices 3.

Step 505: After the counter counts to a predetermined quantity, the road charging system initiates a payment request to the payment platform, where the payment request includes the license plate number of the related vehicle.

Step 506: The payment platform helps complete a payment operation of a toll based on the payment request initiated by the road charging system.

Step 507: When a received payment result is that the payment succeeds, the road charging system controls the corresponding counter to reset.

In an implementation, for steps 505 to 507, references can be made to steps 406 to 408. Details are omitted here for simplicity.

Based on the previous steps, in the process that the vehicle drives on the highway, steps 505 to 507 can be repeatedly triggered, so that the road charging system cooperates with the payment platform, to charge the toll automatically, continually, and stage by stage until the vehicle drives away from the highway.

In an implementation, for the implementation shown in FIG. 5, capability verification can also be performed on a vehicle that wants to enter the highway through steps 401 to 403 in FIG. 4, so as to ensure that the vehicle can support the technical solution of the present specification. Details are omitted here for simplicity.

Based on the implementations shown in FIG. 4 or FIG. 5, in the process that a vehicle drives on a highway, the road charging system cooperates with the payment platform to automatically charge a corresponding toll, so that after the vehicle drives away from the highway, it is assumed by default that the toll is paid by the vehicle. Therefore, the vehicle can directly drive away from an exit of the highway, and there is no need to dispose any facility that may impede or hinder the driving, for example, a railing, at the exit. Therefore, it is ensured that the vehicle can drive away from the exit of the highway smoothly and without interruption. In addition to stage-based charging based on a driving distance in the driving process, because a vehicle certainly needs to drive away from an exit of the highway and the highway usually has many exits, automatic payment of a toll can be triggered only when the vehicle approaches an exit and may drive away from the highway, and normal departure of the vehicle is not affected. The following provides detailed descriptions with reference to FIG. 6 and FIG. 7.

Figure 6:
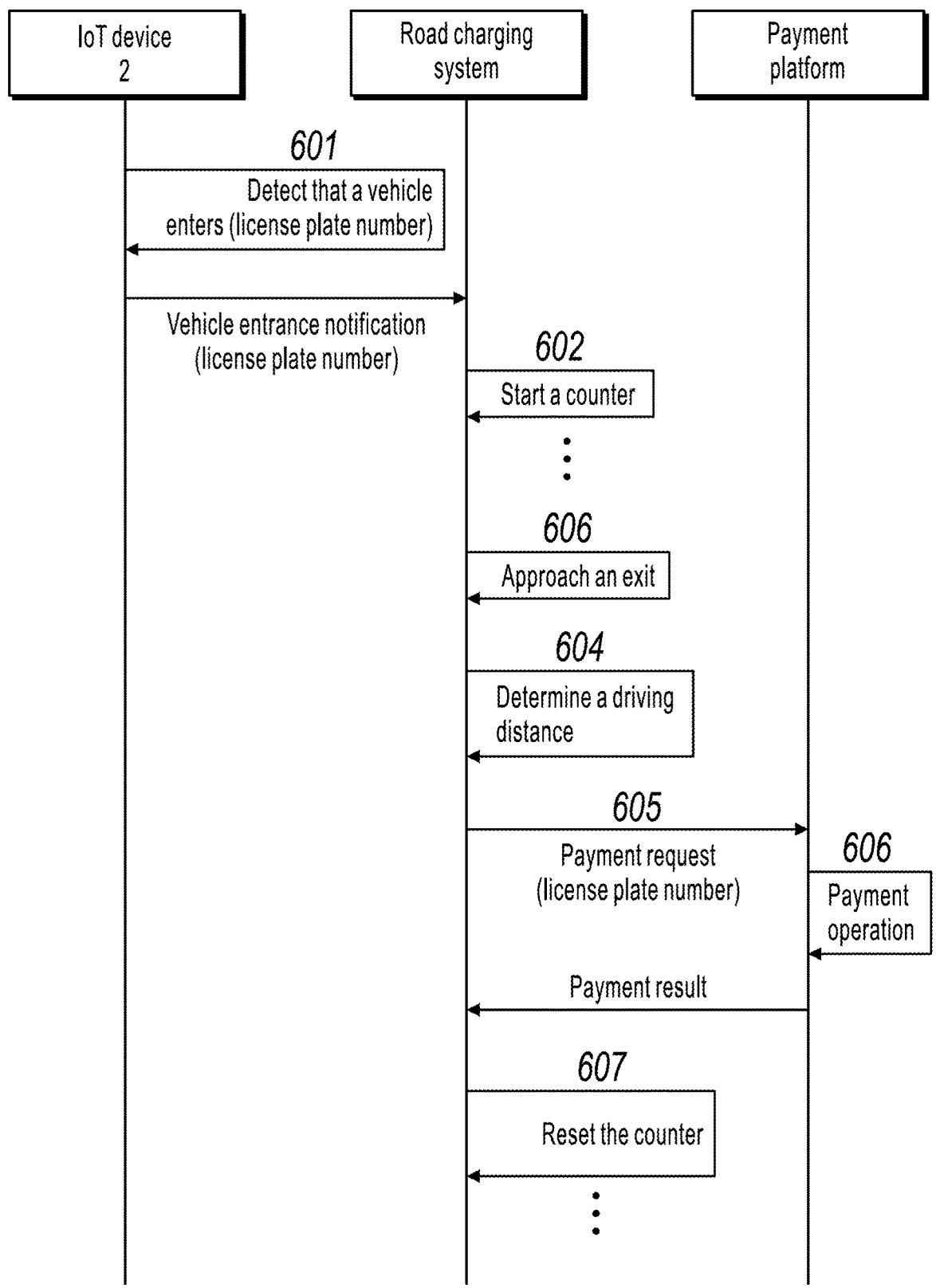
FIG. 6 is a schematic interaction diagram illustrating highway automatic charging, according to an example implementation 2.

FIG. 6 is a schematic interaction diagram illustrating highway automatic charging, according to an example implementation 2. As shown in FIG. 6, assume that a road charging system and an IoT device 2 associated with the road charging system are configured on a highway. The road charging system can automatically charge a toll based on detection data of the IoT device 2 in cooperation with a payment platform. The interaction process of the highway automatic charging can include the following steps.

Step 601: After detecting that a vehicle enters a road section, the IoT device 2 sends a corresponding vehicle entrance notification to the road charging system, where the vehicle entrance notification includes a license plate number of the related vehicle obtained by the IoT device 2.

In an implementation, for step 601, references can be made to step 404 shown in FIG. 4. Details are omitted here for simplicity.

Step 602: The road charging system starts a counter to record a quantity of received vehicle entrance notifications sent by an IoT device 2 corresponding to each road section.

In an implementation, assuming that the license plate number included in the vehicle entrance notification is "A12345", the road charging system can start corresponding counter 1 for "A12345", and counter 1 is dedicated to recording a quantity of vehicle entrance notifications corresponding to the vehicle "A12345", to reflect a driving distance of the vehicle "A12345". Specifically, for step 602, references can be made to step 405 shown in FIG. 4. Details are omitted here for simplicity.

Step 603: The road charging system determines whether the vehicle approaches an exit of the highway based on a location where the IoT device 2 is disposed.

In an implementation, because the location where the IoT device 2 is disposed on the highway is known, and a location of each exit of the highway is also known, the road charging system can determine, based on a device identifier of an IoT device 2 included in the received vehicle entrance notification, whether an exit is at the front of the IoT device 2 corresponding to the device identifier (in a driving direction of the vehicle) (e.g., a distance between the IoT device 2 and the exit is less than 1 km or another distance). If the IoT device 2 is near to the exit, it indicates that the corresponding vehicle "A12345" approaches the exit, and the vehicle may drive away from the highway from the exit.

Step 604: The road charging system determines the driving distance of the vehicle.

In an implementation, the road charging system can calculate the driving distance of the vehicle "A12345" based on a spacing between adjacent IoT devices 2 and the quantity of vehicle entrance notifications counted by counter 1.

Step 605: The road charging system initiates a payment request to the payment platform, where the payment request includes the license plate number and the driving distance/a payment amount of the related vehicle.

Step 606: The payment platform helps complete a payment operation of a toll based on the payment request initiated by the road charging system.

Step 607: When a received payment result returned by the payment platform is that the payment succeeds, the road charging system resets the corresponding counter.

In an implementation, for steps 605 to 607, references can be made to steps 406 to 408 shown in FIG. 4. Details are omitted here for simplicity.

In an implementation, if the vehicle "A12345" does not drive away from the exit, but continues to drive on the highway, the road charging system can continue to perform automatic charging for a subsequent driving distance of the vehicle "A12345" through steps 603 to 607, which does not affect toll charging.

In an implementation, if the vehicle "A12345" actually drives away from the highway from the exit, because the road charging system has charged the corresponding toll in cooperation with the payment platform, the vehicle "A12345" can directly drive away from the exit of the highway, and there is no need to dispose any facility that may impede or hinder the driving, for example, a railing, at the exit. Therefore, it is ensured that the vehicle "A12345" can drive away from the exit of the highway smoothly and without interruption, thereby enhancing user experience and maintaining driving safety and driving order on the highway.

In an implementation, steps 401 to 403 shown in FIG. 4 can also be applied to the implementation shown in FIG. 6. These operations can be performed before step 601, to verify whether the vehicle "A12345" can support the technical solution of the present specification, so that the vehicle "A12345" is allowed to enter the highway only when the vehicle is verified; otherwise, the vehicle is not allowed to pass. As such, the vehicle is prevented from directly driving away from the highway without paying the toll after entering the highway.

Figure 7:
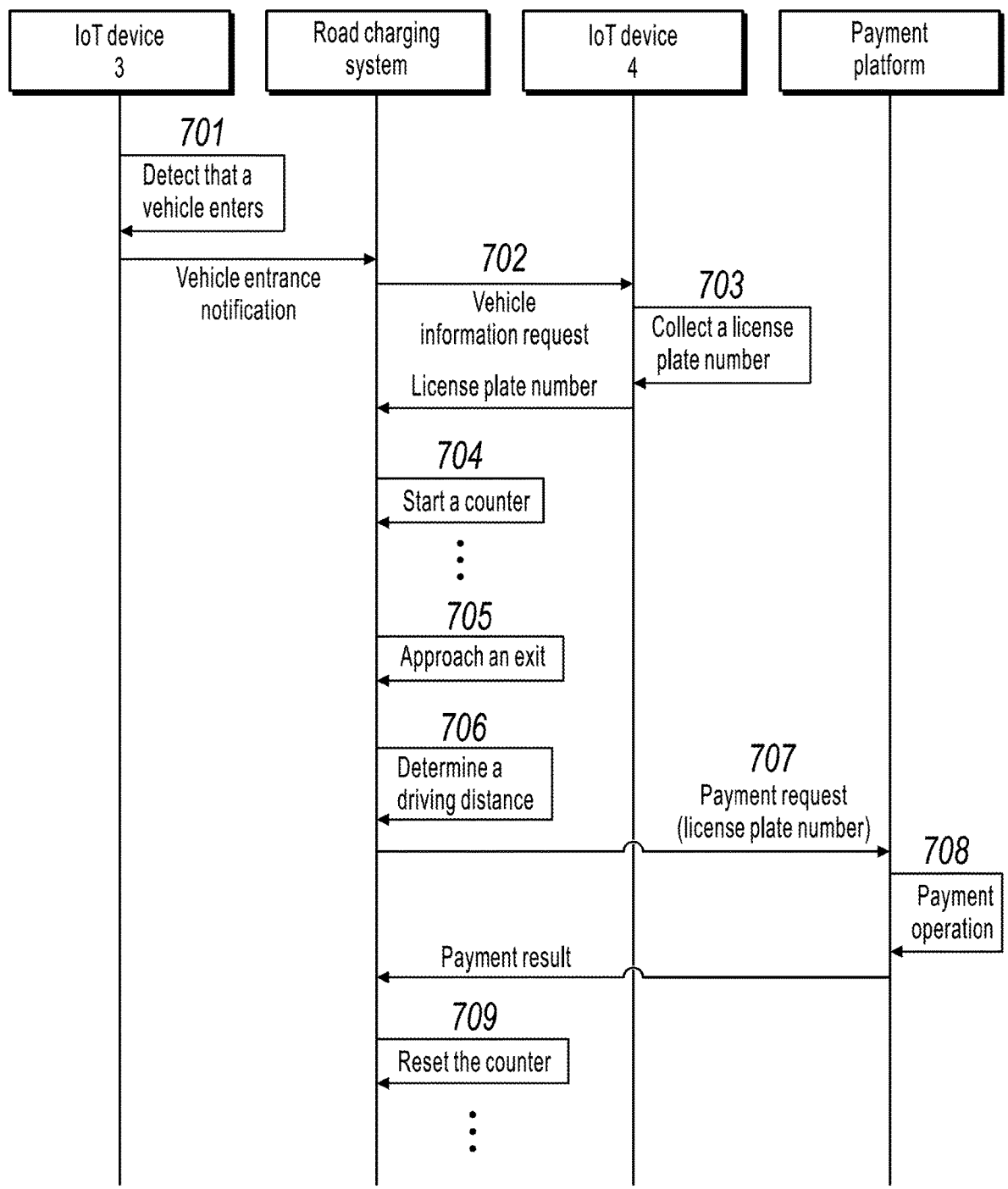
FIG. 7 is a schematic interaction diagram illustrating another type of highway automatic charging, according to an example implementation 2.

In the implementation shown in FIG. 6, the IoT device 2 is configured to identify whether a vehicle enters or drives away from a road section and obtain vehicle information of the vehicle, so that the road charging system can further automatically charge a toll based on a vehicle entrance notification and a vehicle departure notification that are sent by the IoT device 2. In some situations, "identifying whether a vehicle enters or drives away from a road section" and "obtaining vehicle information of the vehicle" can be completed by different IoT devices. The following describes a corresponding implementation with reference to FIG. 7. FIG. 7 is a schematic interaction diagram illustrating another type of highway automatic charging, according to an example implementation 2. As shown in FIG. 7, assume that a road charging system and an IoT device 3 and an IoT device 4 that are associated with the road charging system are configured on a highway. The road charging system can automatically charge a toll based on detection data of the IoT device 3 and the IoT device 4 in cooperation with a payment platform. The interaction process of the highway automatic charging can include the following steps.

Step 701: When detecting that a vehicle enters a road section, the IoT device 3 sends a vehicle entrance notification to the road charging system.

Step 702: The road charging system initiates a vehicle information request to the IoT device 4.

Step 703: The IoT device 4 collects a license plate number, and notifies the road charging system of the license plate number.

In an implementation, for steps 701 to 703, references can be made to steps 501 to 503 shown in FIG. 5. Details are omitted here for simplicity.

Step 704: The road charging system starts a counter to record a quantity of received vehicle entrance notifications sent by an IoT device 3 corresponding to each road section.

In an implementation, the road charging system can also start a counter to count a quantity of same license plate numbers sent by IoT devices 4.

Step 705: The road charging system determines whether the vehicle approaches an exit of the highway based on a location where the IoT device 3 or the IoT device 4 is disposed.

In an implementation, because the location where the IoT device 3 is disposed on the highway is known, and a location of each exit of the highway is also known, the road charging system can determine, based on a device identifier of an IoT device 3 included in the received vehicle entrance notification, whether an exit is at the front of the IoT device 3 corresponding to the device identifier (in a driving direction of the vehicle) (e.g., a distance between the IoT device 3 and the exit is less than 1 km or another distance). If the IoT device 3 is near to the exit, it indicates that the corresponding vehicle "A12345" approaches the exit, and the vehicle may drive away from the highway from the exit.

Step 706: The road charging system determines a driving distance of the vehicle.

In an implementation, the road charging system can calculate the driving distance of the vehicle "A12345" based on a spacing between adjacent IoT devices 3 and the quantity of vehicle entrance notifications counted by counter 1.

Step 707: The road charging system initiates a payment request to the payment platform, where the payment request includes the license plate number and the driving distance/a payment amount of the related vehicle.

Step 708: The payment platform helps complete a payment operation of a toll based on the payment request initiated by the road charging system.

Step 709: When a received payment result returned by the payment platform is that the payment succeeds, the road charging system resets the corresponding counter.

In an implementation, for steps 706 to 709, references can be made to steps 604 to 607 shown in FIG. 6. Details are omitted here for simplicity.

In an implementation, for the implementation shown in FIG. 7, capability verification can also be performed on a vehicle that wants to enter the highway through steps 401 to 403 in FIG. 4, so as to ensure that the vehicle can support the technical solution of the present specification. Details are omitted here for simplicity.

Figure 8:
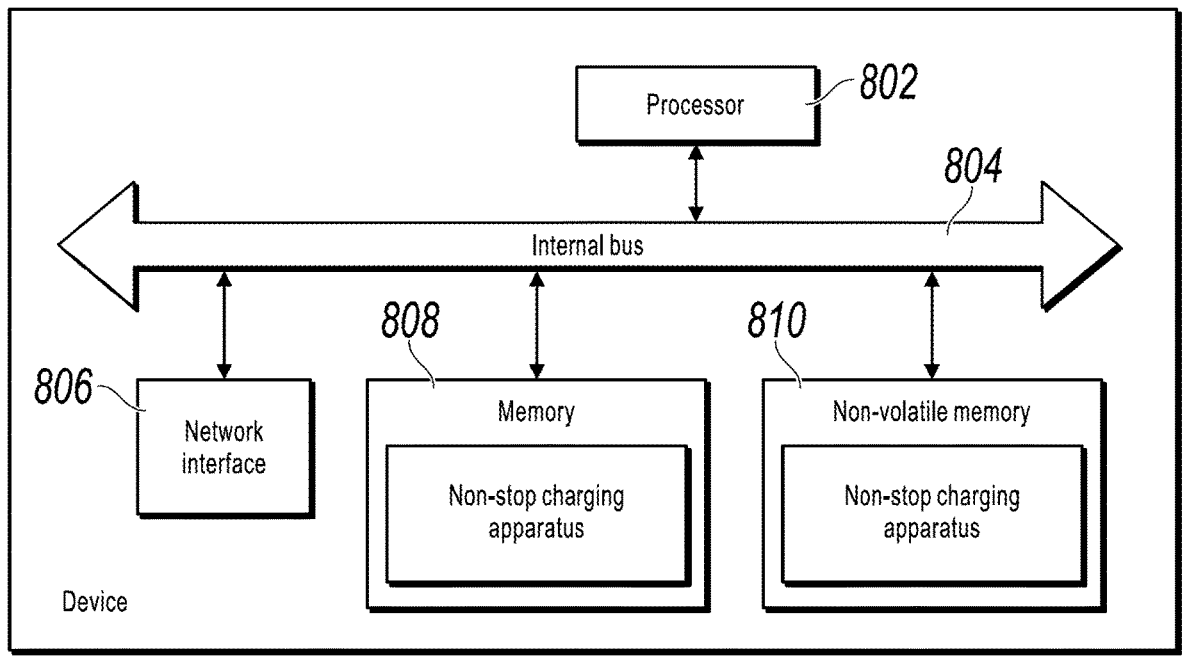
FIG. 8 is a schematic structural diagram illustrating a device, according to an example implementation.

FIG. 8 is a schematic structural diagram illustrating a device, according to an example implementation. As shown in FIG. 8, in terms of hardware, the device includes a processor 802, an internal bus 804, a network interface 806, a memory 808, and a non-volatile memory 810, and certainly can further include other hardware needed by services. The processor 802 reads a corresponding computer program from the non-volatile memory 810 to the memory 808 for running, so that a non-stop charging apparatus is logically formed. Certainly, in addition to software implementation, one or more implementations of the present specification do not exclude other implementations, for example, a logical device or a combination of hardware and software. In other words, an execution body of the following processing procedure is not limited to each logical unit, and can also be hardware or a logical device.

Figure 9:
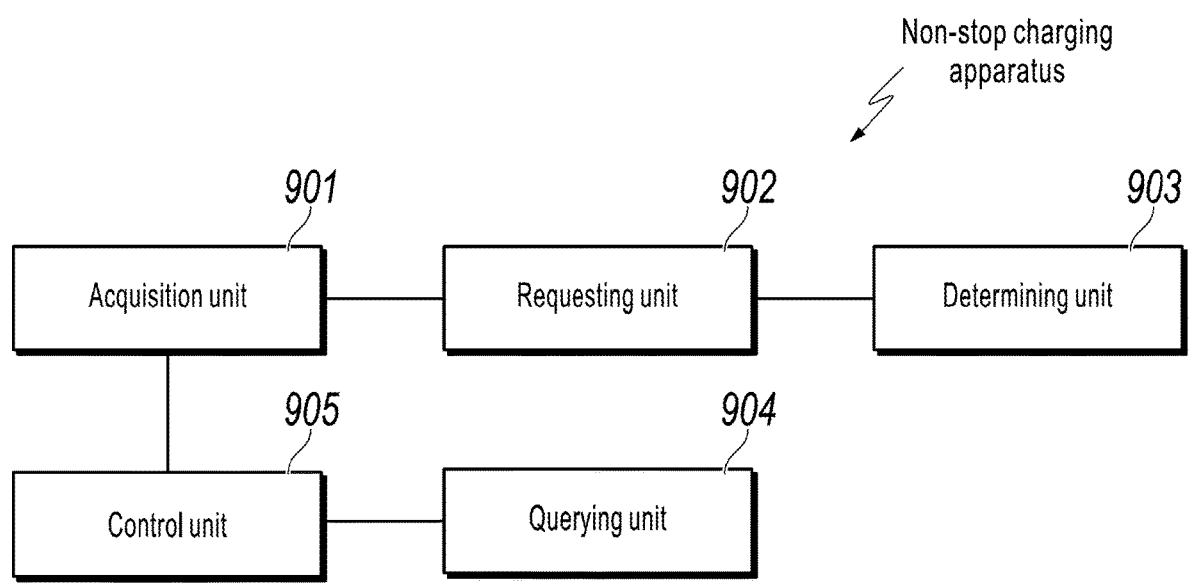
FIG. 9 is a block diagram illustrating a non-stop charging apparatus, according to an example implementation.

In an implementation, as shown in FIG. 9, in a software implementation, the non-stop charging apparatus can include the following: an acquisition unit 901, configured to obtain vehicle information of a driving vehicle on a road, where the vehicle information has a corresponding user account on a payment platform; and a requesting unit 902, configured to initiate an asset charging request for the vehicle information to the payment platform each time a driving distance of the driving vehicle on the road reaches a predetermined distance, so as to charge an asset corresponding to the predetermined distance.

Optionally, the acquisition unit 901 is specifically configured to perform an information acquisition operation on a vehicle on a corresponding section of the road by using a first Internet of Things device associated with the road charging system; and determine the vehicle information of the driving vehicle based on information obtained by the first Internet of Things device.

Optionally, a plurality of first Internet of Things devices are separately installed at corresponding locations on the road, and a spacing between adjacent first Internet of Things devices is not greater than the predetermined distance; and the apparatus further includes the following: a determining unit 903, configured to determine that the driving distance of the driving vehicle reaches the predetermined distance when multiple first Internet of Things devices successively obtain the vehicle information of the driving vehicle and a total spacing between the multiple first Internet of Things devices is the predetermined distance.

Optionally, the first Internet of Things device includes at least one of the following: a monitoring device, an RFID reader, a Bluetooth device, an optical sensor, and a signal receiver.

Optionally, the acquisition unit 901 is specifically configured to: when it is determined that there is a driving vehicle on the corresponding road section by using the first Internet of Things device, further perform an information acquisition operation on the driving vehicle by using the first Internet of Things device; or when it is determined that there is a driving vehicle on the corresponding road section by using a second Internet of Things device associated with the road charging system, further perform an information acquisition operation on the driving vehicle by using the first Internet of Things device.

Optionally, the requesting unit 902 is specifically configured to: when the driving distance of the driving vehicle on the road reaches the predetermined distance, initiate the asset charging request for the vehicle information to the payment platform; and after the asset corresponding to the predetermined distance is charged, reset the driving distance to recalculate the driving distance.

Optionally, the charged asset corresponding to the predetermined distance comes from the user account corresponding to the vehicle information on the payment platform; or when a credit limit of the user account is not exceeded, the charged asset corresponding to the predetermined distance comes from a credit asset related to the user account.

Optionally, the apparatus further includes the following: a querying unit 904, configured to: when any vehicle drives to an entrance of the road, initiate a query request to the payment platform based on vehicle information of the any vehicle; and a control unit 905, configured to: when it is determined that a user account corresponding to the vehicle information of the any vehicle exists on the payment platform, allow the any vehicle to pass, so that the any vehicle enters the road; otherwise, refuse the any vehicle to pass.

Figure 10:
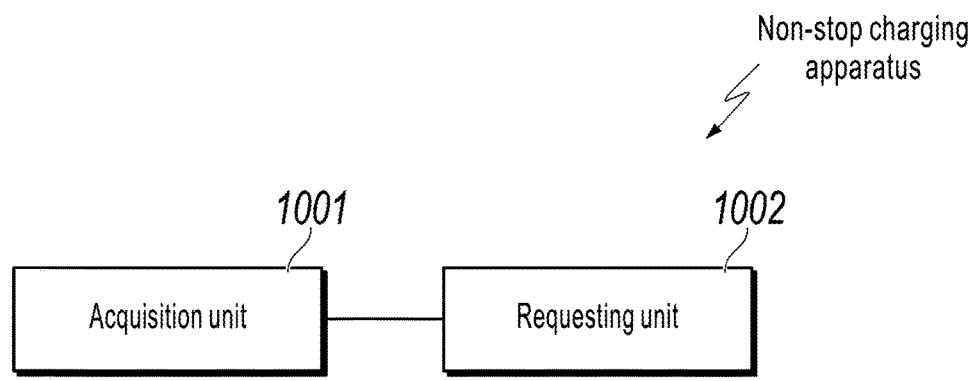
FIG. 10 is a block diagram illustrating another non-stop charging apparatus, according to an example implementation.

In another implementation, as shown in FIG. 10, in a software implementation, the non-stop charging apparatus can include the following: an acquisition unit 1001, configured to obtain vehicle information of a driving vehicle on a road, where the vehicle information has a corresponding user account on a payment platform; and a requesting unit 1002, configured to initiate an asset charging request for the vehicle information to the payment platform based on a driving distance of the driving vehicle on the road each time the driving vehicle approaches any exit of the road, so as to charge an asset corresponding to the driving distance.

Optionally, the requesting unit 1002 is specifically configured to: when the driving vehicle approaches the any exit of the road, initiate the asset charging request for the vehicle information to the payment platform; and after the asset corresponding to the driving distance is charged, reset the driving distance to recalculate the driving distance.

The system, apparatus, module, or unit illustrated in the previous implementations can be specifically implemented by using a computer chip or an entity, or can be implemented by using a product having a certain function. A typical implementation device is a computer, and the computer can be specifically a personal computer, a laptop computer, a cellular phone, a camera phone, a smartphone, a personal digital assistant, a media player, a navigation device, an email receiving and sending device, a game console, a tablet, a wearable device, or any combination of these devices.

In a typical configuration, a computer includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a magnetic disk storage, a quantum memory, a grapheme-based storage medium, or another magnetic storage device or any other non-transmission medium. The computer storage medium can be configured to store information that can be accessed by a computing device. Based on the definition in the present specification, the computer readable medium does not include transitory computer readable media (transitory media) such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

Terms used in one or more implementations of the present specification are merely used to describe specific implementations, and are not intended to limit the one or more implementations of the present specification. The terms "a" and "the" of singular forms used in one or more implementations of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. can be used in one or more implementations of the present specification to describe various types of information, the information is not limited to these terms. These terms are only used to differentiate between information of the same type. For example, without departing from the scope of one or more implementations of the present specification, first information can also be referred to as second information, and similarly, the second information can be referred to as the first information. Depending on the context, for example, the word "if" used here can be explained as "while", "when", or "in response to determining".

The previous descriptions are only example implementations of one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

What is claimed is:

1. A computer-implemented method for charging toll fees performed by a tolling system, comprising:
   receiving, by a first Internet of Things (IoT) device, a message triggered by a second IoT device detecting that a vehicle is traveling on a road;
   in response to receiving the message, obtaining, by the first IoT device, information of the vehicle, wherein the vehicle is associated with a user account on a payment platform; and
   in response to determining that a distance the vehicle is driven on the road reaches a predetermined distance, initiating, by the first IoT device, a toll fee charging request for the vehicle to the payment platform to charge a toll fee corresponding to the predetermined distance.

2. The computer-implemented method according to claim 1, wherein the distance the vehicle is driven on the road reaches the predetermined distance is determined based on:
   detecting the vehicle by a plurality of IoT devices installed on the road; and determining that a distance between two IoT devices of the plurality of IoT devices located furthest apart is greater than or equal to the predetermined distance.

3. The computer-implemented method according to claim 1, wherein the first IoT device comprises at least one of a monitoring device, a radio frequency identifier (RFID) reader, a Bluetooth device, an optical sensor, or a signal receiver; and the second IoT device comprises at least one of an underground induction coil, a ranging device, or an infrared detection device.

4. The computer-implemented method according to claim 1, further comprises:
after a toll fee corresponding to the predetermined distance is charged, resetting a distance for determining whether the vehicle is driven for the predetermined distance.

5. The computer-implemented method according to claim 1, wherein a toll fee is charged through credit payment from the user account corresponding to the vehicle when a credit limit of the user account is not exceeded.

6. The computer-implemented method according to claim 1, further comprising:
automatically allowing drive-through of the vehicle of a tollgate on the road in response to determining that the user account corresponding to the vehicle exists on the payment platform.

7. A computer-implemented system for charging toll fees, comprising:
one or more computers; and
one or more computer memory devices interoperably coupled with the one or more computers and having tangible, non-transitory, machine-readable media storing one or more instructions that, when executed by the one or more computers, perform operations comprising:
receiving, by a first Internet of Things (IoT) device, a message triggered by a second IoT device detecting that a vehicle is traveling on a road;
in response to receiving the message, obtaining, by the first IoT device, information of the vehicle, wherein the vehicle is associated with a user account on a payment platform; and
in response to determining that a distance the vehicle is driven on the road reaches a predetermined distance, initiating, by the first IoT device, a toll fee charging request for the vehicle to the payment platform to charge a toll fee corresponding to the predetermined distance.

8. The computer-implemented system according to claim 7, wherein the distance the vehicle is driven on the road reaches the predetermined distance is determined based on:
detecting the vehicle by a plurality of IoT devices installed on the road; and
determining that a distance between two IoT devices of the plurality of IoT devices located furthest apart is greater than or equal to the predetermined distance.

9. The computer-implemented system according to claim 7, wherein the first IoT device comprises at least one of a monitoring device, a radio frequency identifier (RFID) reader, a Bluetooth device, an optical sensor, or a signal receiver; and the second IoT device comprises at least one of an underground induction coil, a ranging device, or an infrared detection device.

10. The computer-implemented system according to claim 7, further comprises:
after a toll fee corresponding to the predetermined distance is charged, resetting a distance for determining whether the vehicle is driven for the predetermined distance.

11. The computer-implemented system according to claim 7, wherein a toll fee is charged through credit payment from the user account corresponding to the vehicle when a credit limit of the user account is not exceeded.

12. The computer-implemented system according to claim 7, further comprising:
automatically allowing drive-through of the vehicle of a tollgate on the road in response to determining that the user account corresponding to the vehicle exists on the payment platform.

13. A non-transitory, computer-readable medium storing one or more instructions executable by a computer system to perform operations for charging toll fees, the operations comprising:
receiving, by a first Internet of Things (IoT) device, a message triggered by a second IoT device detecting that a vehicle is traveling on a road;
in response to receiving the message, obtaining, by the first IoT device, information of the vehicle, wherein the vehicle is associated with a user account on a payment platform; and
in response to determining that a distance the vehicle is driven on the road reaches a predetermined distance, initiating, by the first IoT device, a toll fee charging request for the vehicle to the payment platform to charge a toll fee corresponding to the predetermined distance.

14. The non-transitory, computer-readable medium according to claim 13, wherein the distance the vehicle is driven on the road reaches the predetermined distance is determined based on:
detecting the vehicle by a plurality of IoT devices installed on the road; and
determining that a distance between two IoT devices of the plurality of IoT devices located furthest apart is greater than or equal to the predetermined distance.

15. The non-transitory, computer-readable medium according to claim 13, wherein the first IoT device comprises at least one of a monitoring device, a radio frequency identifier (RFID) reader, a Bluetooth device, an optical sensor, or a signal receiver; and the second IoT device comprises at least one of an underground induction coil, a ranging device, or an infrared detection device.

16. The non-transitory, computer-readable medium according to claim 13, further comprises:
after a toll fee corresponding to the predetermined distance is charged, resetting a distance for determining whether the vehicle is driven for the predetermined distance.

17. The non-transitory, computer-readable medium according to claim 13, wherein a toll fee is charged through credit payment from the user account corresponding to the vehicle when a credit limit of the user account is not exceeded.

18. The non-transitory, computer-readable medium according to claim 13, further comprising:
automatically allowing drive-through of the vehicle of a tollgate on the road in response to determining that the user account corresponding to the vehicle exists on the payment platform.

* * * * *